(12) United States Patent
Cheng

(10) Patent No.: US 12,480,650 B2
(45) Date of Patent: Nov. 25, 2025

(54) FRONT LIGHT MODULE AND MANUFACTURING METHOD THEREOF

(71) Applicant: E Ink Holdings Inc., Hsinchu (TW)

(72) Inventor: Chao-Chun Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/732,642

(22) Filed: Jun. 4, 2024

(65) Prior Publication Data

US 2025/0027642 A1    Jan. 23, 2025

(30) Foreign Application Priority Data

Jul. 19, 2023   (TW) .............................. 112126878

(51) Int. Cl.
    *F21V 31/00*      (2006.01)
    *F21V 8/00*      (2006.01)
    *F21V 31/04*      (2006.01)

(52) U.S. Cl.
CPC ............ *F21V 31/005* (2013.01); *F21V 31/04* (2013.01); *G02B 6/0065* (2013.01); *G02B 6/0093* (2013.01); *F21V 2200/20* (2015.01)

(58) Field of Classification Search
CPC ..... F21V 31/005; F21V 31/04; G02B 6/0065; G02B 6/0093
See application file for complete search history.

(56) References Cited

U.S. PATENT DOCUMENTS

| 11,071,223 | B2 | 7/2021 | Zhang et al. |
| 2011/0024315 | A1 | 2/2011 | Kim |
| 2012/0155224 | A1 | 6/2012 | Chuang |
| 2016/0116817 | A1 | 4/2016 | Wu et al. |
| 2016/0291238 | A1* | 10/2016 | Tai ....................... G02F 1/13338 |
| 2016/0341890 | A1 | 11/2016 | Zhang |
| 2019/0056099 | A1* | 2/2019 | Shei ..................... F21V 19/0035 |
| 2019/0129092 | A1* | 5/2019 | Zhang .................. G02B 6/0088 |

FOREIGN PATENT DOCUMENTS

| CN | 112904616 A | 6/2021 |
| TW | 201319691 A | 5/2013 |
| TW | 202114199 A | 4/2021 |

OTHER PUBLICATIONS

The corresponding Office Action of TW112126878 mailed on Sep. 26, 2024.

* cited by examiner

*Primary Examiner* — Abdulmajeed Aziz
*Assistant Examiner* — Nathaniel J Lee
(74) *Attorney, Agent, or Firm* — CKC & Partners Co., LLC

(57) ABSTRACT

A front light module includes a light guide plate, a light source, first waterproof layers, a second waterproof layer, and a third waterproof layer. An edge of the light guide plate has an extending portion. The light source is located on the edge of the light guide plate. There are two first waterproof layers respectively located on a bottom surface and a top surface of the light guide plate. The second waterproof layer has a concave portion. The light source is located between the second waterproof layer and the edge of the light guide plate, and the extending portion of the light guide plate extends into the concave portion of the second waterproof layer. The third waterproof layer is located in the concave portion of the second waterproof layer and surrounds the extending portion of the light guide plate.

13 Claims, 5 Drawing Sheets

FRONT LIGHT MODULE AND MANUFACTURING METHOD THEREOF

CROSS-REFERENCE TO RELATED APPLICATIONS

This application claims priority to Taiwan Application Serial Number 112126878, filed Jul. 19, 2023 which is herein incorporated by reference.

BACKGROUND

Field of Invention

The present disclosure relates to a front light module and a manufacturing method of the front light module.

Description of Related Art

A reflective display device needs to use a front light module to provide incident light in an environment with insufficient light. The front light module can adopt a light emitting diode (LED) as a light source, and the light emitting diode is a humidity sensitive element. In order to achieve the purpose of waterproofing, it is necessary to enclose the area having the LED light source into a closed space by using many different waterproof materials to form a waterproof periphery to prevent water vapor from entering and damaging the LED light source. However, there may be small gaps between different waterproof materials. Although waterproof glue can be used to further seal the waterproof materials, the glue injection channel of the front light module does not have specific design so that the channel is too short and the area for glue injection is difficult to be controlled, which is prone to cause process risks to form gaps, thereby failing to maintain good waterproof performance. As a result, when water vapor enters the area of the LED light source, if the water vapor stays at the electrode of the LED light source, it will cause a short circuit to damage the LED light source.

SUMMARY

One aspect of the present disclosure provides a front light module.

According to some embodiments of the present disclosure, a front light module includes a light guide plate, a light source, first waterproof layers, a second waterproof layer, and a third waterproof layer. An edge of the light guide plate has an extending portion. The light source is located on the edge of the light guide plate. The first waterproof layers are respectively located on a bottom surface and a top surface of the light guide plate. The second waterproof layer has a concave portion, wherein the light source is located between the second waterproof layer and the edge of the light guide plate, and the extending portion of the light guide plate extends into the concave portion of the second waterproof layer. The third waterproof layer is located in the concave portion of the second waterproof layer and surrounds the extending portion of the light guide plate.

In some embodiments, the third waterproof layer is located between the second waterproof layer and the extending portion of the light guide plate.

In some embodiments, the third waterproof layer is in contact with sidewalls of the first waterproof layers and a sidewall of the light guide plate.

In some embodiments, the front light module further includes a fourth waterproof layer. The fourth waterproof layer is located on a bottom surface of the first waterproof layer that is on the bottom surface of the light guide plate, a bottom surface of the third waterproof layer, and a bottom surface of the second waterproof layer.

In some embodiments, the fourth waterproof layer has a plurality of holes, and the holes are located in an area between the light guide plate and the second waterproof layer.

In some embodiments, the front light module further includes a fifth waterproof layer located on a bottom surface of the fourth waterproof layer, and configured to close the holes.

In some embodiments, the fourth waterproof layer and the fifth waterproof layer are polyethylene terephthalate (PET) film or Mylar film.

In some embodiments, the first waterproof layers and the second waterproof layer are foam adhesives, double-sided tapes, or waterproof adhesives of moisture curing, heat curing, AB glue, or ultraviolet (UV) curing, and the third waterproof layer is an optical adhesive of moisture curing, heat curing, AB glue, or ultraviolet (UV) curing.

In some embodiments, the front light module further includes a flexible printed circuit board. The flexible printed circuit board is located on a top surface of the first waterproof layer that is on the top surface of the light guide plate, a top surface of the third waterproof layer, and a top surface of the second waterproof layer.

One aspect of the present disclosure provides a manufacturing method of a front light module.

According to some embodiments of the present disclosure, a manufacturing method of a front light module includes forming an extending portion of a light guide plate on an edge of the light guide plate; forming first waterproof layers respectively located on a bottom surface and a top surface of the light guide plate, wherein a light source is located on the edge of the light guide plate; forming a second waterproof layer having a concave portion such that the light source is located between the second waterproof layer and the edge of the light guide plate, wherein the extending portion of the light guide plate extends into the concave portion of the second waterproof layer; and injecting a third waterproof layer into the concave portion of the second waterproof layer such that the third waterproof layer surrounds the extending portion of the light guide plate.

In some embodiments, the manufacturing method of the front light module further includes before injecting the third waterproof layer into the concave portion of the second waterproof layer, attaching a fourth waterproof layer to a bottom surface of the first waterproof layer that is on the bottom surface of the light guide plate and a bottom surface of the second waterproof layer, wherein the fourth waterproof layer has a plurality of holes.

In some embodiments, the manufacturing method of the front light module further includes attaching a fifth waterproof layer to a bottom surface of the fourth waterproof layer.

In some embodiments, the manufacturing method of the front light module further includes before injecting the third waterproof layer into the concave portion of the second waterproof layer, disposing a flexible printed circuit board on a top surface of the first waterproof layer that is on the top surface of the light guide plate and a top surface of the second waterproof layer, such that the flexible printed circuit board, the second waterproof layer, the fourth waterproof layer, the first waterproof layer, and the light guide plate define a glue injection channel.

In some embodiments, injecting the third waterproof layer into the concave portion of the second waterproof layer further includes injecting the third waterproof layer into the glue injection channel.

In some embodiments, injecting the third waterproof layer into the glue injection channel is performed such that air in the glue injection channel is exhausted from the holes of the fourth waterproof layer.

In the aforementioned embodiments of the present disclosure, since the edge of the light guide plate of the front light module has the extending portion and the second waterproof layer has the concave portion, and the extending portion of the light guide plate extends into the concave portion of the second waterproof layer, the length of the glue injection channel can be increased such that the third waterproof layer can be located in the concave portion of the second waterproof layer and surround the extending portion of the light guide plate. As a result, the glue injection area of the front light module can be easily controlled to maintain good waterproof performance, thereby preventing water vapor (moisture) from entering a light source area to cause a short circuit to damage the light source.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
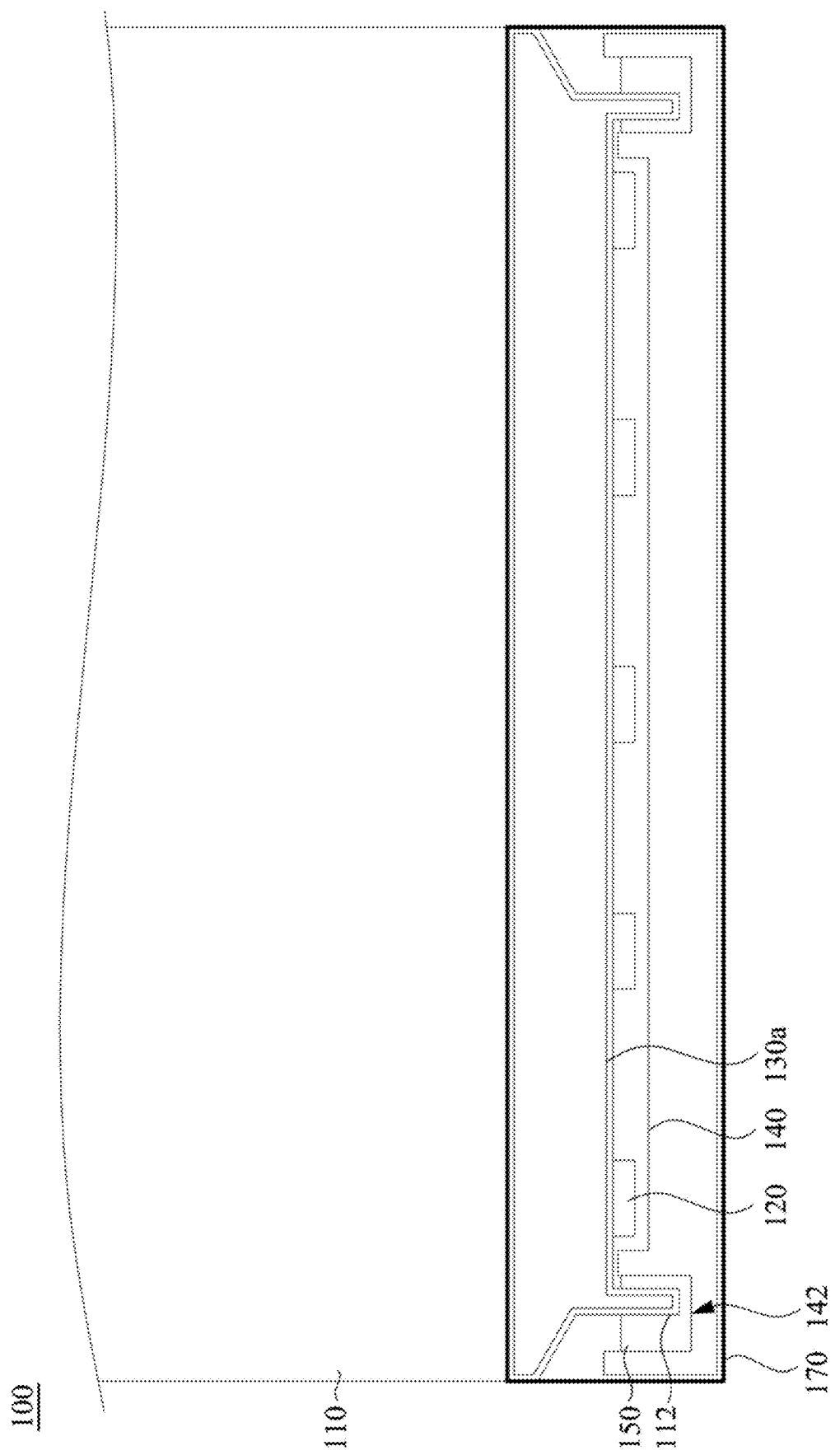
FIG. 1 is a top view of a front light module according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 4:
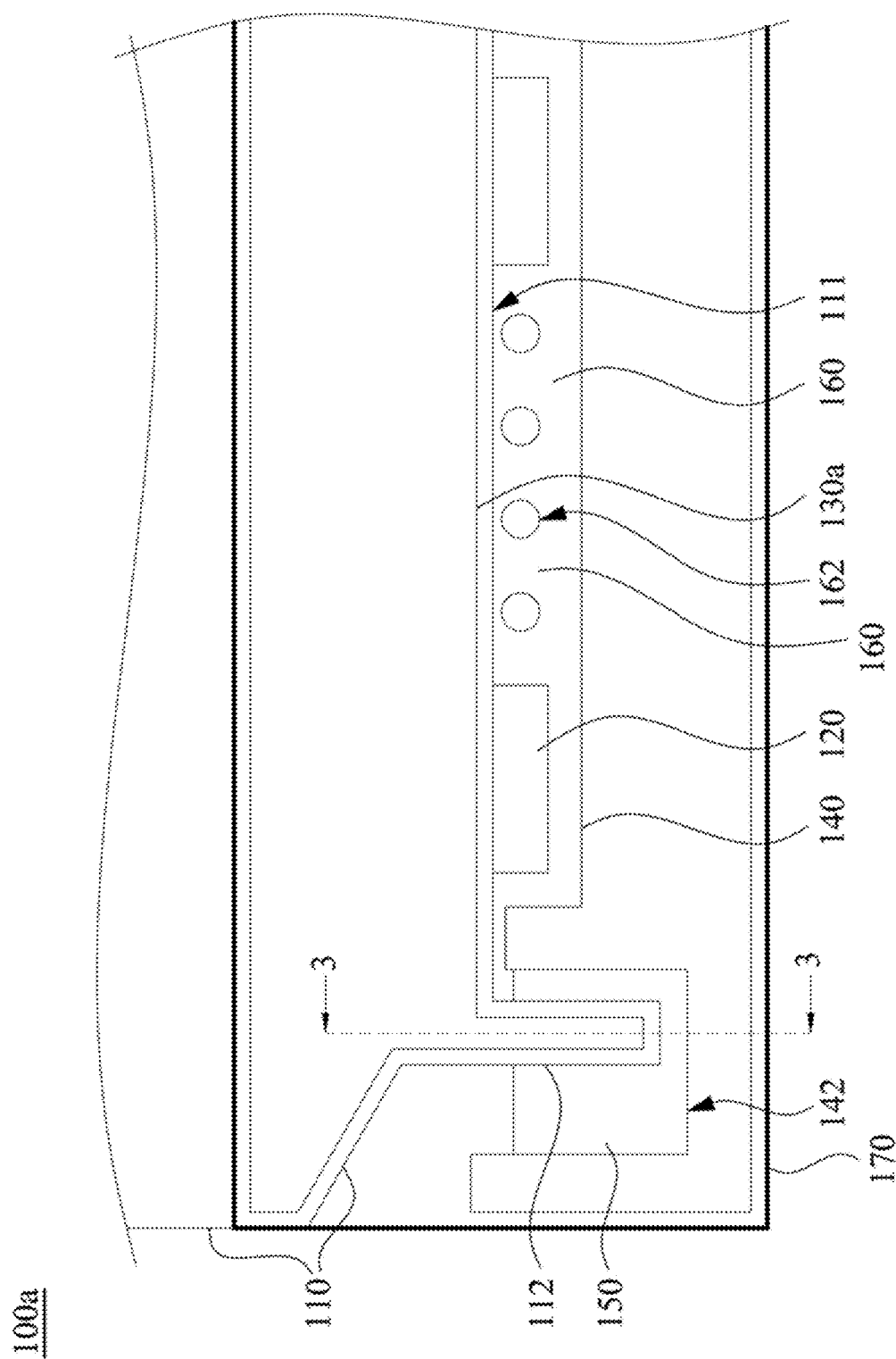
FIG. 4 is a top view of a front light module according to another embodiment of the present disclosure.

FIG. 1 is a top view of a front light module 100 according to one embodiment of the present disclosure. The front light module 100 includes a light guide plate 110, a light source 120, and a flexible printed circuit board 170. The light source 120 is adjacent to the light guide plate 110 (e.g., a gap from 0 to 1 mm). The light of the light source 120 can enter the lateral side of the light guide plate 110, thereby lighting up the entire light guide plate 110. The flexible printed circuit board 170 is electrically connected to the light source 120 to supply power to the light source 120. The flexible printed circuit board 170 extends outward from one side of the light guide plate 110 to cover the edge area of the light guide plate 110, the light source 120, and other material layers. In order to clarity the drawings, it is to be noted that the uppermost flexible printed circuit board 170 shown in each of FIGS. 1, 2 and 4 is indicated by the range surrounded by thick lines, and that the light source 120 and other material layers covered by the flexible printed circuit board 170 are shown in solid lines.

The front light module 100 may be applied to a reflective display device to provide front light to display media (e.g. electronic ink) when ambient light is insufficient. In the following descriptions, various layers of the front light module 100 will be explained in detail.

Figure 2:
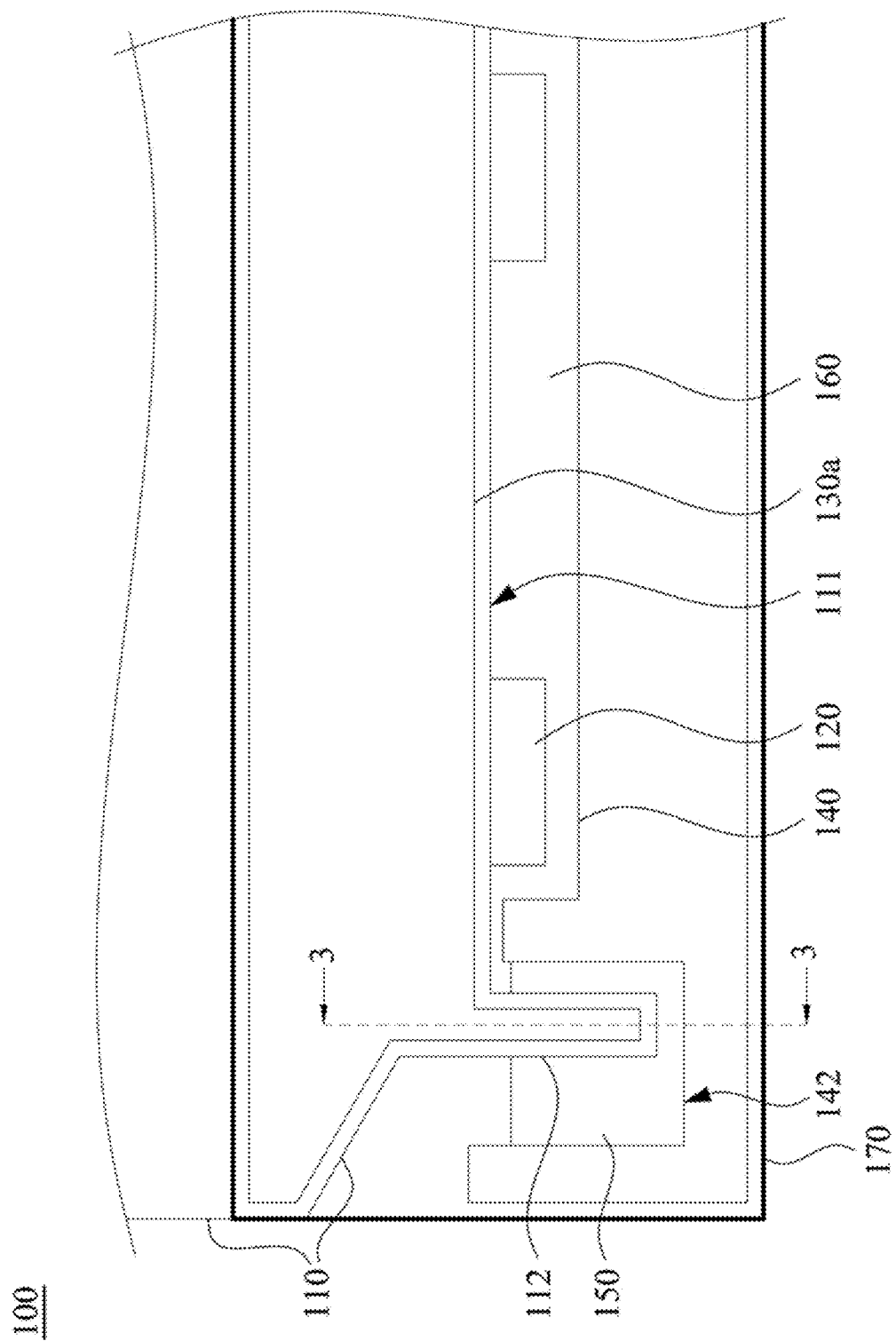
FIG. 2 is a partially enlarged view of the front light module of FIG. 1.
Figure 3:
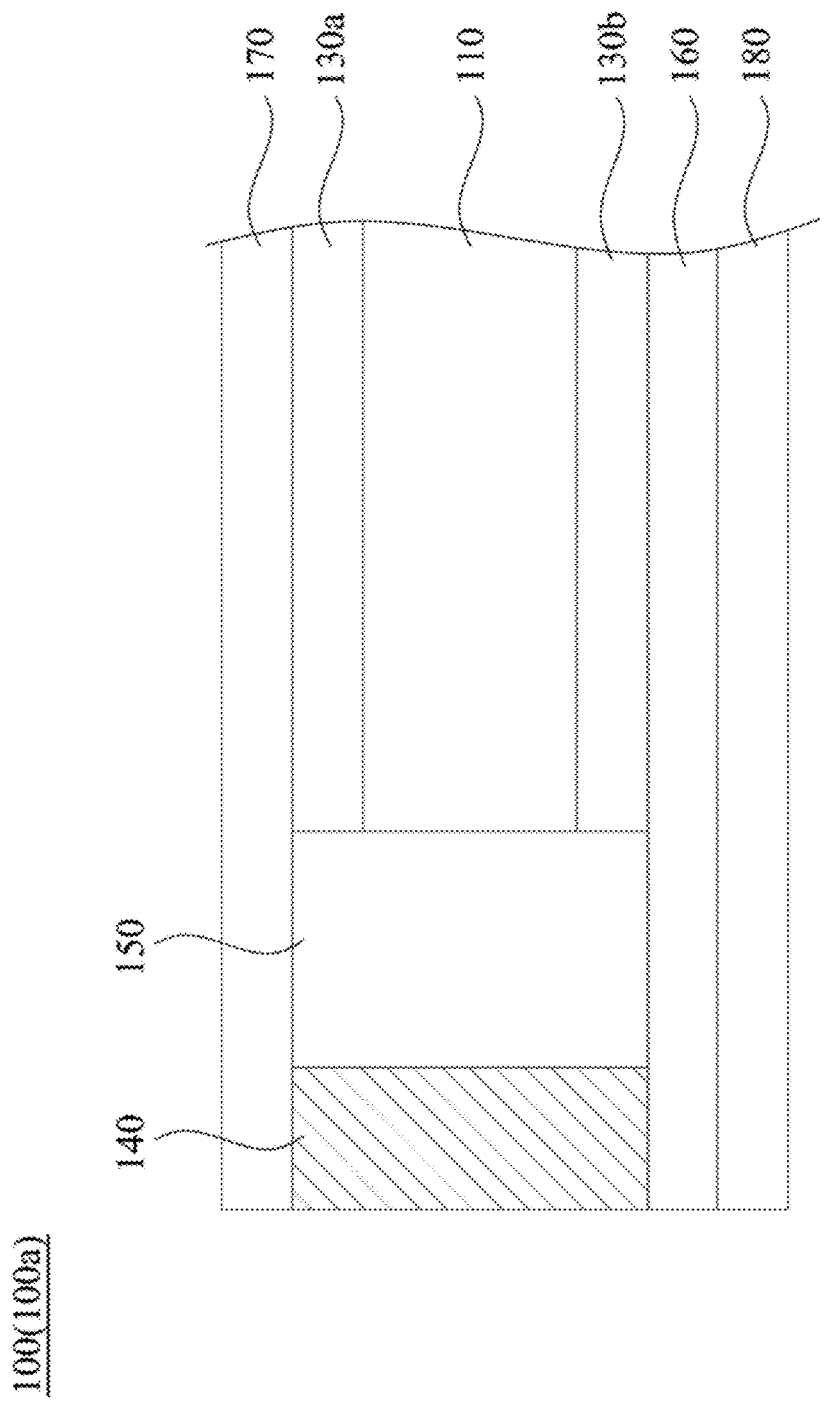
FIG. 3 is a cross-sectional view of the front light module taken along line 3-3 of FIG. 2.

FIG. 2 is a partially enlarged view of the front light module 100 of FIG. 1. FIG. 3 is a cross-sectional view of the front light module 100 taken along line 3-3 of FIG. 2. As shown in FIG. 2 and FIG. 3, the light source 120 is located on an edge 111 of the light guide plate 110. The front light module 100 includes first waterproof layers 130a and 130b, a second waterproof layer 140, and a third waterproof layer 150. The edge 111 of the light guide plate 110 has an extending portion 112. The extending portion 112 is a protruding structure, such as an elongated or toothed structure. The first waterproof layer 130a is located on the top surface of the light guide plate 110, and the first waterproof layer 130b is located on the bottom surface of the light guide plate 110. In other words, the light guide plate 110 is located between the first waterproof layers 130a and 130b. The second waterproof layer 140 has a concave portion 142. The extending portion 112 of the light guide plate 110 extends into the concave portion 142 of the second waterproof layer 140, such that the extending portion 112 of the light guide plate 110 and the concave portion 142 of the second waterproof layer 140 can form two sidewalls of a channel to act as retaining walls for the third waterproof layer 150. The third waterproof layer 150 is located in the concave portion 142 of the second waterproof layer 140 and surrounds the extending portion 112 of the light guide plate 110. In addition, the light source 120 is located between the second waterproof layer 140 and the edge 111 of the light guide plate 110.

In some embodiments, the material of the light guide plate 110 may be glass, polycarbonate (PC), polymethyl methacrylate (PMMA), or other inorganic or organic materials suitable for light-transmitting media. The shape of the light guide plate 110 may be manufactured by punching process, CNC processing, laser cutting, or one-piece molding (integrally formed as a single piece). The first waterproof layers 130a, 130b and the second waterproof layer 140 may be foam lock adhesives, waterproof double-sided tapes, or waterproof adhesives of moisture curing, heat curing, AB glue, or ultraviolet (UV) curing, and their materials may be PMMA base, polyurethane (PU) base, silicone base or other waterproof adhesive series. The third waterproof layer 150 is an optical adhesive of moisture curing, heat curing, AB glue, or ultraviolet (UV) curing, and its material may be PMMA base, silicone base or other adhesive series with waterproof performance and good optical properties.

Specifically, since the edge 111 of the light guide plate 110 of the front light module 100 has the extending portion 112 and the second waterproof layer 140 has the concave portion 142, and the extending portion 112 of the light guide plate 110 extends into the concave portion 142 of the second waterproof layer 140, the length of the glue injection channel (i.e., the area where the third waterproof layer 150 is) can be increased such that the third waterproof layer 150 can be located in the concave portion 142 of the second waterproof layer 140 and surround the extending portion 112 of the light guide plate 110. As a result, the glue injection area of the front light module 100 can be easily controlled to maintain good waterproof performance, thereby preventing water vapor (moisture) from entering a light source area to cause a short circuit to damage the light source 120. Moreover, the operation life of the front light module 100 can be further improved.

In this embodiment, the flexible printed circuit board 170 is located on the top surface of the first waterproof layer 130a, the top surface of the third waterproof layer 150, and the top surface of the second waterproof layer 140. The front light module 100 further includes a fourth waterproof layer 160. The fourth waterproof layer 160 is located on the bottom surface of the first waterproof layer 130b, the bottom surface of the third waterproof layer 150, and the bottom surface of the second waterproof layer 140. The flexible printed circuit board 170, the second waterproof layer 140, the fourth waterproof layer 160, the two first waterproof layers 130a, 130b, and the light guide plate 110 define a glue injection channel for being filled with the third waterproof layer 150, such that the third waterproof layer 150 is located between the second waterproof layer 140 and the extending portion 112 of the light guide plate 110, and the third waterproof layer 150 is in contact with the sidewalls of the two first waterproof layers 130a, 130b and the sidewall of the light guide plate 110. The inlet of the glue injection channel of FIG. 2 is at the left side of the extending portion 112 of the light guide plate 110, and the third waterproof layer 150 can be injected to expand from the left side of the extending portion 112 to the right side of extending portion 112. Through the aforementioned design, the reliability of filling the channel with glue (i.e., the third waterproof layer 150) can be ensured to prevent the problem of waterproof failure caused by insufficient glue filling. In addition, the front light module 100 uses simple materials and has good assembly stability.

Moreover, the front light module 100 further includes a fifth waterproof layer 180 located on the bottom surface of the fourth waterproof layer 160. The fourth waterproof layer 160 and the fifth waterproof layer 180 may be polyethylene terephthalate (PET) film or Mylar film.

It is to be noted that the connection relationships, the materials, and the advantages of the elements described above will not be repeated in the following description. In the following description, other types of front light modules will be explained.

FIG. 4 is a top view of a front light module 100a according to another embodiment of the present disclosure. The cross-sectional view of the front light module 100a is the same as FIG. 3. As shown in FIG. 3 and FIG. 4, the front light module 100a includes the light guide plate 110, the light source 120, the first waterproof layers 130a and 130b, the second waterproof layer 140, the third waterproof layer 150, the fourth waterproof layer 160, the fifth waterproof layer 180, and the flexible printed circuit board 170. The difference between this embodiment and the embodiment of FIG. 2 is that the fourth waterproof layer 160 has a plurality of holes 162 that are located in an area between the light guide plate 110 and the second waterproof layer 140, and the holes 162 separate from the light source 120 and do not overlap the light source 120, as shown in FIG. 4. In this embodiment, the fifth waterproof layer 180 on the bottom surface of the fourth waterproof layer 160 is configured to close the holes 162 of the fourth waterproof layer 160. The fourth waterproof layer 160 may be attached to the first waterproof layer 130b before injecting the third waterproof layer 150, and then the third waterproof layer 150 is injected into the glue injection channel. The holes 162 of the fourth waterproof layer 160 can serve as air outlets when injecting the third waterproof layer 150, such that the third waterproof layer 150 is easier to inject. After injecting the third waterproof layer 150 and curing the third waterproof layer 150 complete, the fifth waterproof layer 180 may be attached such that water vapor does not enter through the holes 162 of the fourth waterproof layer 160.

In the following description, the manufacturing method of the front light module 100a will be explained.

Figure 5:
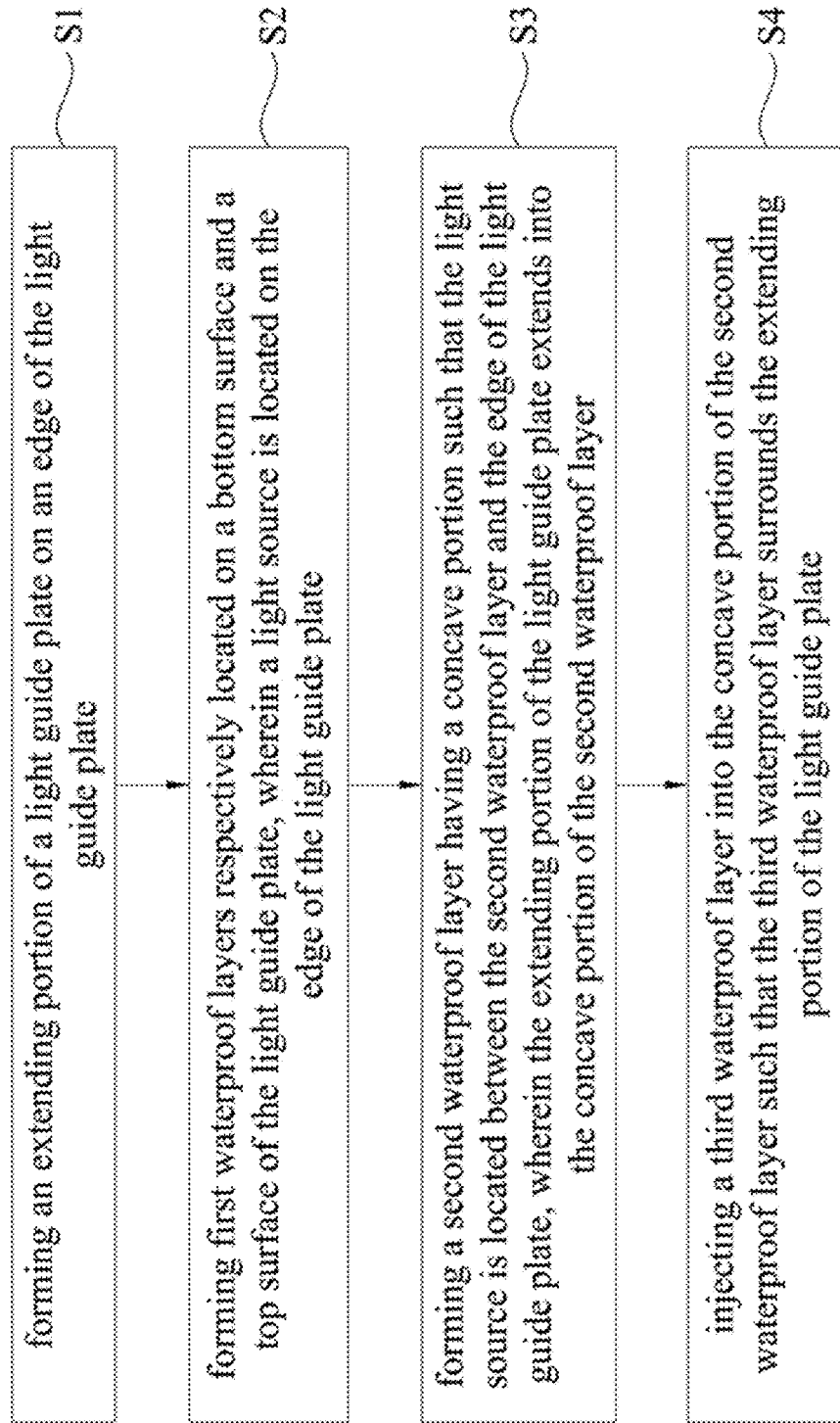
FIG. 5 is a flow chart of a manufacturing method of a front light module according to one embodiment of the present disclosure.

FIG. 5 is a flow chart of a manufacturing method of a front light module according to one embodiment of the present disclosure. The manufacturing method of the front light module includes the following steps. In step S1, an extending portion of a light guide plate is formed on an edge of the light guide plate. For example, the shape of the light guide plate may be manufactured by punching process, CNC processing, laser cutting, or one-piece molding. Thereafter, in step S2, first waterproof layers respectively located on a bottom surface and a top surface of the light guide plate are formed, wherein a light source is located on the edge of the light guide plate. Next, in step S3, a second waterproof layer having a concave portion is formed such that the light source is located between the second waterproof layer and the edge of the light guide plate, wherein the extending portion of the light guide plate extends into the concave portion of the second waterproof layer. Subsequently, in step S4, a third waterproof layer is injected into the concave portion of the second waterproof layer such that the third waterproof layer surrounds the extending portion of the light guide plate. In addition, each of steps S1 to S4 may include plural detailed steps, the method may include other steps between step S1 and step S4, and the method may include other steps before step S1 and after step S4.

As shown in FIG. 3 and FIG. 4, in manufacturing the front light module 100a, the light guide plate 110 may be treated to form the extending portion 112 on its edge 111 by punching process, CNC processing, or laser cutting. Thereafter, the first waterproof layers 130a and 130be may be respectively formed on the top surface and the bottom surface of the light guide plate 110 by coating or attaching. Afterwards, the second waterproof layer 140 having the concave portion 142 can be formed such that the light source 120 is located between the second waterproof layer 140 and the edge 111 of the light guide plate 110, and the extending portion 112 of the light guide plate 110 extends into the concave portion 142 of the second waterproof layer 140. The formation of the second waterproof layer 140 may include coating or attaching the second waterproof layer 140 on the bottom surface of the flexible printed circuit board 170 or the top surface of the fourth waterproof layer 160, and then the flexible printed circuit board 170 is disposed on the top surface of the first waterproof layer 130a and the top surface of the second waterproof layer 140, and the fourth waterproof layer 160 is attached to the bottom surface of the first waterproof layer 130b and the bottom surface of the second waterproof layer 140. The present disclosure is not limited to the arrangement order of the flexible printed circuit board 170 and the fourth waterproof layer 160, the flexible printed circuit board 170 and the fourth waterproof layer 160 can be disposed at the same time to sandwich the second waterproof layer 140 therebetween. In this embodiment, the fourth waterproof layer 160 has the holes 162.

Before injecting the third waterproof layer 150 into the concave portion 142 of the second waterproof layer 140, the flexible printed circuit board 170, the second waterproof layer 140, the fourth waterproof layer 160, the first waterproof layers 130a, 130b, and the light guide plate 110 define the glue injection channel. After the formation of the glue injection channel, the third waterproof layer 150 can be injected into the concave portion 142 of the second waterproof layer 140. In other words, the third waterproof layer 150 is injected into the aforementioned glue injection channel. When the third waterproof layer 150 is injected into the glue injection channel, air in the glue injection channel can be exhausted from the holes 162 of the fourth waterproof layer 160. After the formation of the third waterproof layer 150, the fifth waterproof layer 180 can be attached to the bottom surface of the fourth waterproof layer 160 to close the holes 162 of the fourth waterproof layer 160, thereby preventing water vapor from entering. Through the above steps, the front light module 100a of FIG. 4 can be obtained.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A front light module, comprising:
    a light guide plate, wherein an edge of the light guide plate has an extending portion;
    a light source located on the edge of the light guide plate;
    first waterproof layers respectively located on a bottom surface and a top surface of the light guide plate;
    a second waterproof layer having a concave portion, wherein the light source is located between the second waterproof layer and the edge of the light guide plate, and the extending portion of the light guide plate extends into the concave portion of the second waterproof layer;
    a third waterproof layer located in the concave portion of the second waterproof layer and surrounding the extending portion of the light guide plate; and
    a fourth waterproof layer located on a bottom surface of the first waterproof layer that is on the bottom surface of the light guide plate, a bottom surface of the third waterproof layer, and a bottom surface of the second waterproof layer.

2. The front light module of claim 1, wherein the third waterproof layer is located between the second waterproof layer and the extending portion of the light guide plate.

3. The front light module of claim 1, wherein the third waterproof layer is in contact with sidewalls of the first waterproof layers and a sidewall of the light guide plate.

4. The front light module of claim 1, wherein the fourth waterproof layer has a plurality of holes, and the holes are located in an area between the light guide plate and the second waterproof layer.

5. The front light module of claim 4, further comprising:
    a fifth waterproof layer located on a bottom surface of the fourth waterproof layer, and configured to close the holes.

6. The front light module of claim 5, wherein the fourth waterproof layer and the fifth waterproof layer are polyethylene terephthalate (PET) film or Mylar film.

7. The front light module of claim 1, wherein the first waterproof layers and the second waterproof layer are foam adhesives, double-sided tapes, or waterproof adhesives of moisture curing, heat curing, AB glue, or ultraviolet (UV) curing, and the third waterproof layer is an optical adhesive of moisture curing, heat curing, AB glue, or ultraviolet (UV) curing.

8. The front light module of claim 1, further comprising:
    a flexible printed circuit board located on a top surface of the first waterproof layer that is on the top surface of the light guide plate, a top surface of the third waterproof layer, and a top surface of the second waterproof layer.

9. A manufacturing method of a front light module, comprising:
    forming an extending portion of a light guide plate on an edge of the light guide plate;
    forming first waterproof layers respectively located on a bottom surface and a top surface of the light guide plate, wherein a light source is located on the edge of the light guide plate;
    forming a second waterproof layer having a concave portion such that the light source is located between the second waterproof layer and the edge of the light guide plate, wherein the extending portion of the light guide plate extends into the concave portion of the second waterproof layer;
    injecting a third waterproof layer into the concave portion of the second waterproof layer such that the third waterproof layer surrounds the extending portion of the light guide plate; and
    before injecting the third waterproof layer into the concave portion of the second waterproof layer, attaching a fourth waterproof layer to a bottom surface of the first waterproof layer that is on the bottom surface of the light guide plate and a bottom surface of the second waterproof layer, wherein the fourth waterproof layer has a plurality of holes.

10. The manufacturing method of the front light module of claim 9, further comprising:
    attaching a fifth waterproof layer to a bottom surface of the fourth waterproof layer.

11. The manufacturing method of the front light module of claim 9, further comprising:
    before injecting the third waterproof layer into the concave portion of the second waterproof layer, disposing a flexible printed circuit board on a top surface of the first waterproof layer that is on the top surface of the light guide plate and a top surface of the second waterproof layer, such that the flexible printed circuit board, the second waterproof layer, the fourth waterproof layer, the first waterproof layers, and the light guide plate define a glue injection channel.

12. The manufacturing method of the front light module of claim 11, wherein injecting the third waterproof layer into the concave portion of the second waterproof layer further comprises:

injecting the third waterproof layer into the glue injection channel.

13. The manufacturing method of the front light module of claim 12, wherein injecting the third waterproof layer into the glue injection channel is performed such that air in the glue injection channel is exhausted from the holes of the fourth waterproof layer.

* * * * *